June 21, 1955      S. A. SMITH      2,711,008

MANUFACTURE OF STATORS FOR ELECTRIC MOTORS

Filed Oct. 2, 1951      4 Sheets-Sheet 1

INVENTOR
Sidney A. Smith
by Kenway, Jenney, Witter & Hildreth
Att'ys

June 21, 1955 S. A. SMITH 2,711,008
MANUFACTURE OF STATORS FOR ELECTRIC MOTORS
Filed Oct. 2, 1951 4 Sheets-Sheet 2

INVENTOR
Sidney A. Smith
by Kenway, Jenney, Witter & Hildreth
Attys.

June 21, 1955 S. A. SMITH 2,711,008
MANUFACTURE OF STATORS FOR ELECTRIC MOTORS
Filed Oct. 2, 1951 4 Sheets-Sheet 3
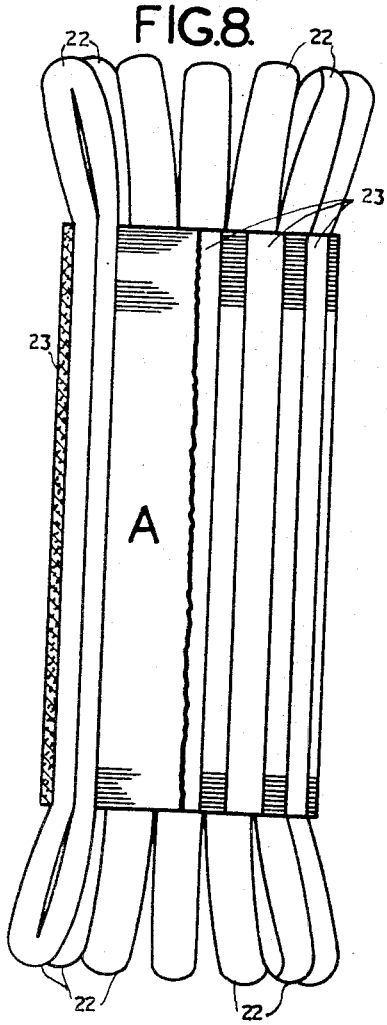
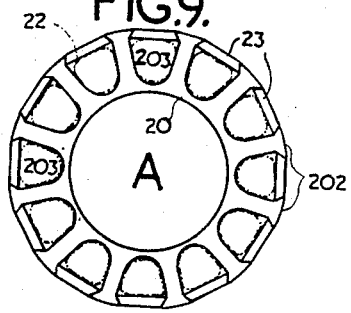
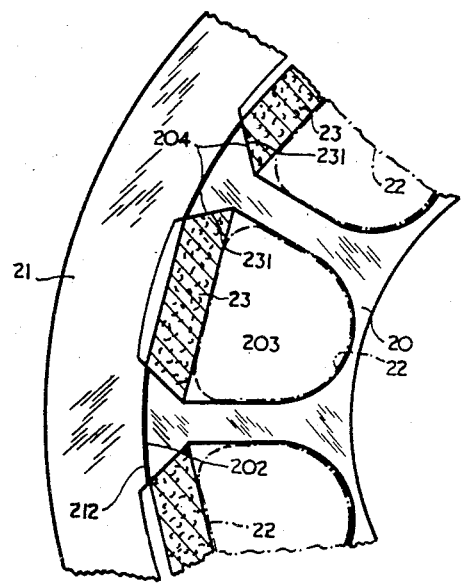
INVENTOR
Sidney A. Smith June 21, 1955  S. A. SMITH  2,711,008
MANUFACTURE OF STATORS FOR ELECTRIC MOTORS
Filed Oct. 2, 1951  4 Sheets-Sheet 4

INVENTOR
Sidney A. Smith
by Munway, Jenney, Witter & Hildreth
Attys.

United States Patent Office 2,711,008
Patented June 21, 1955

2,711,008

MANUFACTURE OF STATORS FOR ELECTRIC MOTORS

Sidney Arthur Smith, Solihull, Birmingham, England, assignor to James Beresford & Son Limited, Birmingham, England, a limited liability company, of Great Britain Application October 2, 1951, Serial No. 249,252

Claims priority, application Great Britain October 26, 1950

1 Claim. (Cl. 29—155.5)

This invention has reference to improvements relating to the manufacture of stators for electric motors and has for its object to provide an improved and simplified method of manufacture which enables a strong and robust stator to be produced at a relatively low cost.

According to the invention the improved method of manufacturing stators for electric motors is characterised in that the stator is formed initially as two sections namely a laminated fluted or recessed tubular core and a laminated sleeve and in that the laminae for the core and the laminae for the sleeve are produced simultaneously from one piece by a single press tool and in that the laminae are so formed that the sleeve may be united to the core to constitute a unit assembly by shrinking the sleeve on to the core or expanding the core into the sleeve following an alteration in the setting of the core laminae relatively to the sleeve laminae from that obtained at the time of production of the said laminae.

The invention also resides in a stator manufactured in accordance with the method aforesaid.

An embodiment of the invention will now be described with particular reference to the accompanying drawings which illustrate the invention in its application to the manufacture of a stator for the electric motor of a submersible electrically driven pump.

In the drawings:

Figure 8 is a view partly in vertical section and partly in elevation of the core after the insertion of the coils.

Figure 9 is a plan of Figure 8.

Figure 10 is a fragmentarly view in plan and on an enlarged scale illustrating the relationship between the sleeve and the core during the shrinking of the sleeve on to the core or during the expansion of the core into the sleeve.

According to the said illustrated embodiment of the invention the stator is constituted by two separately formed parts namely a tubular inner core designated generally by the reference letter A and an outer sleeve designated generally by the reference letter B.

The core A and sleeve B aforesaid are each built up from a plurality of sheet metal laminae which are assembled and riveted together to form the parts concerned.

Figure 1:
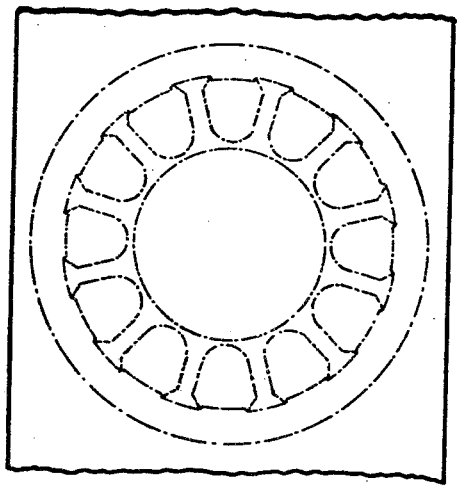
Figure 1 is a blank showing in chain outline the cuts to be made by the press tool.
Figure 2:
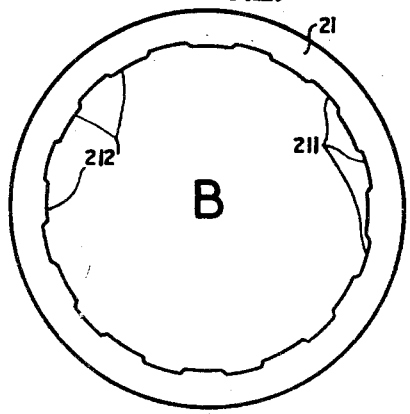
Figure 2 is a plan of the outer laminae from which the sleeve is built up.
Figure 3:
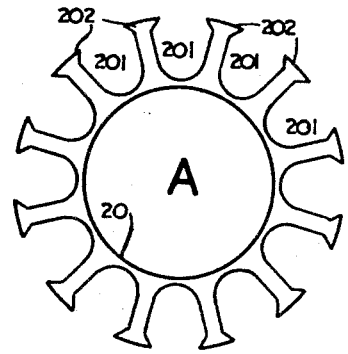
Figure 3 is a plan of the inner laminae from which the core is built up.
Figure 4:
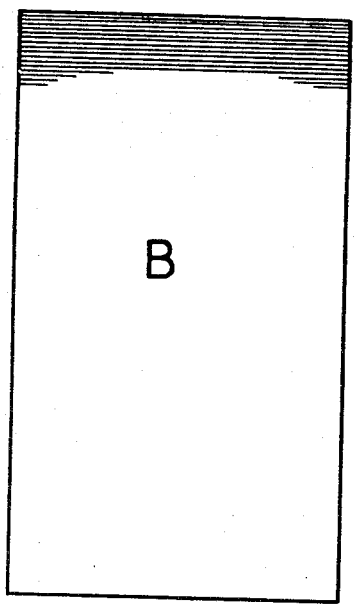
Figure 4 is a vertical section of the sleeve built up of the laminae illustrated in Figure 2.
Figure 5:
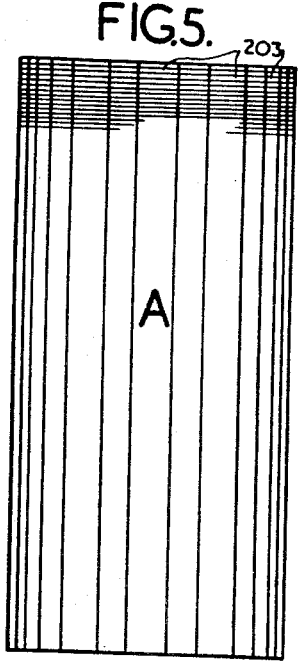
Figure 5 is a vertical section of the core built up of the laminae illustrated in Figure 3.
Figure 6:
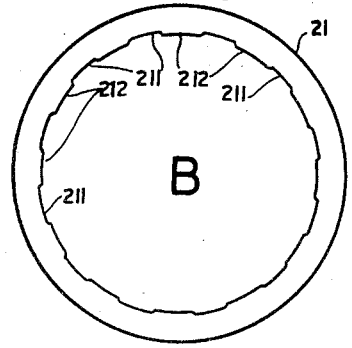
Figure 6 is a plan of the sleeve illustrated in Figure 4.
Figure 7:
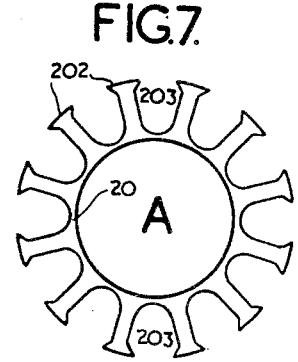
Figure 7 is a plan of the core illustrated in Figure 5.
Figure 11:
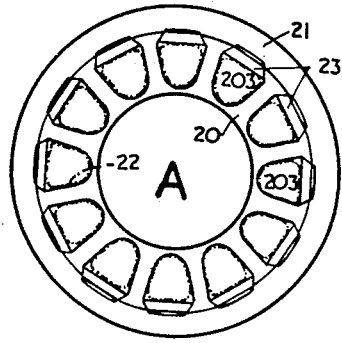
Figure 11 is a plan of the assembled sleeve and core.
Figure 13:
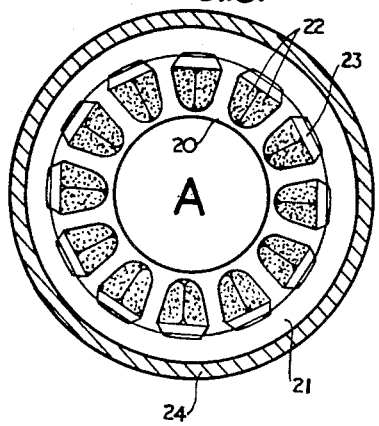
Figure 13 is a plan of Figure 12.
Figure 12:
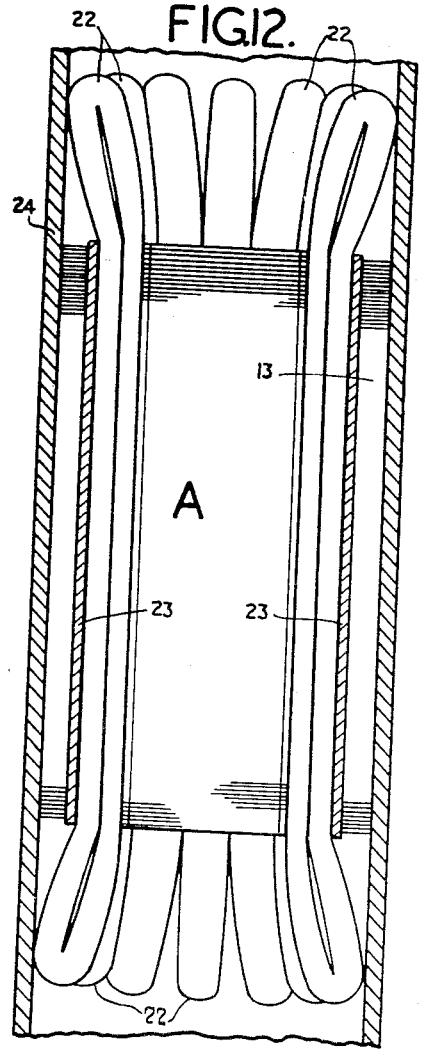
Figure 12 is a vertical section of the assembly shown in Figure 11 after the shrinking thereon of an outer casing or after the expansion of the assembly shown in Figure 11 into an outer casing.

The laminae for the construction of the core A and of the sleeve B are produced simultaneously from one piece by the operation of a single press tool which effects cuts as indicated by chain outlines in Figure 1.

This press tool is formed so that it produces the laminae 20 for the sleeve B as annular pressings the inner peripheries of which are of unbroken circular formation and the outer peripheries of which are relatively deeply recessed or indented as at 201 with the ends of the projections 202 between the recesses 201 severed from the inner peripheries of the sleeve B whilst the laminae 21 for the sleeve B are formed as annular pressings having outer peripheries which are of unbroken circular formation and inner peripheries which are shallowly indented as at 211 with the shallow projections 212 between the indentations 211 of the sleeve B complementary to the indentations 201 of the core A.

The ends of the projections 212 of the sleeve laminae 21 are arranged to bound a circle which is slightly less in diameter than the circle bounding the ends of the projections 202 of the core laminae 20. It will be apparent that the material forming the outer ends of the projections 202 is removed from the recesses or indentations 211 of the sleeve B.

After assembly of the laminae 20 to constitute the core A the indentations 201 of the laminae 20 provide a plurality of longitudinally arranged flutes or recesses 203 for the reception of pre-formed coils 22 for constituting the windings of the stator.

After assembly of the laminae 20 to form the core A and prior to the insertion of the coils 22 the core A is ground to a diameter which is only slightly in excess of the diameter of the circle containing the ends of the shallow projections 212 of the sleeve B, that is the core A is ground to a size such that it has an interference fit with respect to a bore having a diameter equal to the diameter of the circle including the ends of the projections 212.

Subsequent to the positioning of the pre-formed coils 22 within the flutes or recesses 203, the said coils 22 are retained in position by sliding into the outer ends of the flutes or recesses 203 fibre retaining members 23 having inclined sides 231 which co-operate with correspondingly inclined surfaces 204 of the core projections 202 so that the said fibre retaining members 23 may be wedged in the retaining position.

The sleeve B is now associated with the core A by heating the sleeve B to a temperature such that it may be passed over the core A with the ends of the core projections 202 in register with the ends of the sleeve projections 212 so that upon cooling the sleeve B is shrunk on to the core A to constitute a unit assembly.

Finally an outer casing 24 of non-corrodible metal conveniently brass is shrunk over the sleeve B and core A assembly and the coils 22 impregnated with an electrical insulating compound which is impervious to water.

If desired, instead of shrinking the sleeve B on to the core A assembly, the core A may be cooled to an extent such that the resultant contraction permits the core A to be passed into the sleeve B so that on the core A being permitted to regain the temperature of the sleeve B, the said core A is expanded into contact with the sleeve B to constitute the desired unit assembly.

Likewise, instead of shrinking the outer casing 24 on to the core A and sleeve B assembly, the said assembly may be cooled to allow of the assembly being inserted into the outer casing 24 and the assembly subsequently allowed to expand into unity with the said outer casing.

As above explained, the step of uniting the core and sleeve to form a unit assembly may be carried out by any procedure involving effecting through the agency of temperature change a difference in dimensions of the core relatively to the sleeve which permits the core to be inserted within the sleeve in a manner such that on restoration of a uniform temperature in the core and in the sleeve the said parts are securely united by the expansion or contraction of one of the parts.

It should be appreciated that the invention enables a strong and robust stator to be produced at a relatively low cost and further permits of the stator being furnished with pre-formed coils 22 which may be fitted from the outside thus again resulting in an economy of manufacture over existing practice.

It is to be understood that the invention is not limited to the manufacture of stators for the electric motors of submersible electrically driven pumps but may be employed for the manufacture of electric motors for other purposes.

I claim:

In the manufacture of stators for electric motors according to which the stator is built up of an assembly consisting of a laminated core having external recesses for the accommodation of preformed windings which after the positioning of the windings is secured within a laminated sleeve; the characteristic steps of producing the laminae for the construction of the core and the laminae for the construction of the sleeve simultaneously from one blank by a single press tool which effects an outer unbroken circular severance, an inner unbroken circular severance and an intermediate severance, the latter separating the core lamina from the sleeve lamina and producing a core lamina having an unbroken circular inner periphery and an outer periphery of alternate recesses and projections, and also a sleeve lamina having an unbroken circular outer periphery and an inner periphery of alternate shallow indentations and projections with the ends of the projections lying between the indentations and the core lamina severed from the sleeve lamina along the line of cut which produces the shallow indentations of the sleeve lamina, building a core from the core laminae, removing that material from the ends of the projections of the core which was originally included in the recesses of the sleeve and thus reducing the diameter of the core to a diameter slightly in excess of the diameter of the circle of the inner ends of the said projections of the sleeve, building a sleeve from the sleeve laminae, inserting and securing preformed windings in the external recesses of the core, effecting through the agency of temperature change a difference in dimensions of the core relatively to the sleeve which permits the core to be inserted within the sleeve in a manner such that on restoration of a uniform temperature in the core and in the sleeve the said parts are securely united, and then inserting and turning the core relative to the sleeve so that the ends of the projections of the core are located opposite the ends of the projections of the sleeve lamina and uniting the core and sleeve to form a unit assembly.

References Cited in the file of this patent

UNITED STATES PATENTS

| | | |
|---|---|---|
| 1,260,743 | Attila | Mar. 26, 1918 |
| 1,635,064 | Wagner | July 5, 1927 |
| 2,172,191 | Denman | Sept. 5, 1939 |
| 2,565,530 | Smith | Aug. 28, 1951 |

FOREIGN PATENTS

| | | |
|---|---|---|
| 834,913 | France | Dec. 6, 1938 |

OTHER REFERENCES

The Modern Industrial Press, Magazine, September 1947, pages 46 and 48.